United States Patent
Rolston (10) Patent No.: US 6,272,647 B1
(45) Date of Patent: Aug. 7, 2001

(54) FAULT TOLERANT CLOCK VOTER WITH RECOVERY

(75) Inventor: Charles W. Rolston, Plymouth, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/196,950

(22) Filed: Nov. 20, 1998

(51) Int. Cl.$^7$ .................................................. G06F 1/04
(52) U.S. Cl. ................................... 713/500; 714/814
(58) Field of Search ................... 713/500, 503; 714/34, 814

(56) References Cited

U.S. PATENT DOCUMENTS

| | | | |
|---|---|---|---|
| 4,542,509 | * 9/1985 | Buchanan et al. | 714/814 |
| 4,800,564 | * 1/1989 | DeFazio et al. | 714/814 |
| 4,811,343 | * 3/1989 | Johansson et al. | 714/814 X |
| 5,377,206 | * 12/1994 | Smith | 714/814 X |
| 5,404,363 | 4/1995 | Kraus et al. | |
| 5,537,583 | * 7/1996 | Truons | 713/500 |

* cited by examiner

Primary Examiner—Thomas M. Heckler
(74) Attorney, Agent, or Firm—Kris T. Fredrick (57) ABSTRACT

A fault tolerant clock system which employs a plurality of latches each of which is set to fault a clock signal upon the occurrence of one of a like plurality of anomalies and each of which can be independently reset so that the system can be started with asynchronous signals and so that, upon the removal of the anomalies, the latches can be reset to unfault previously faulted signals when the anomaly causing the fault has been cured.

28 Claims, 3 Drawing Sheets

FAULT TOLERANT CLOCK VOTER WITH RECOVERY

FIELD OF THE INVENTION

The present invention relates generally to fault tolerant clocks and more particularly to a novel clock voter having the ability to recover from temporary faults.

DESCRIPTION OF THE PRIOR ART

U.S. Pat. No. 5,404,363 of James M. Krause et al entitled "Two Fail-Operational Fault-Tolerant Multiple Clock System" and assigned to the assignee of the present invention is incorporated herein by reference. The '363 patent describes a fault tolerant clock which requires initial synchronization of up to four clock signals and which includes a circuit that operates to produce a fault signal whenever a clock signal has a leading edge that occurs too early or too late with respect to a reference clock or has a trailing edge that occurs too early with respect to the reference clock or which has excessive noise. These signals are described in connection with FIG. 9 of the '363 patent.

In operation, if any of the faults occur, a fault signal is sent to a latch therein (a D flip-flop 96 in the '363 patent) and a fault output occurs which prevents the faulty clock signal from being used in the voter.

An undesirable feature arises in the operation of the circuit of the '363 patent when a fault is corrected. With the above described operation, the D flip-flop which was set by the occurrence of a fault cannot be reset until a "clock enable" signal occurs which is basically only at the start of operation. Thus, even though a clock signal may no longer be faulty, it cannot be used by the voter. While some systems are shut down relatively frequently (e.g. daily) so that system reset signals occur not too infrequently, some applications, such as Digital Global Positioning Systems (DGPS), are in operation for many months and system reset signals are too infrequent for practical use.

The circuit of the '363 patent also requires synchronous start up of the clocks which is acceptable when all circuits can be started in a controlled time interval of each other. However, in some desirable uses of a fault tolerant clock, such as DGPS, signals from multiple satellite receivers are used. The receivers are independent from each other and when they acquire sufficient satellite signals they begin to output time mark signals. Although the satellite receivers may be energized simultaneously, each receiver will not complete acquisition at the same time so the time marks do not start simultaneously. This asynchronous start up would cause the circuit of the '363 patent to fault the inputs and to fail to issue a voted time signal.

SUMMARY OF THE INVENTION

The present invention solves these and other needs by providing a modified fault response circuit. Since no single reset pulse is appropriate for all of the fault types, a separate latch for each of the possible faults to be detected is incorporated. Each latch has its own reset which is performed regularly, often and independently of the clock enable signal so that when a fault is corrected and becomes valid again, the clock signal can quickly be used to contribute to the voted output. Furthermore, with each fault having its own latch, asynchronous start up is possible since any latch set at start up would be reset shortly after reception of a valid signal.

DETAILED DESCRIPTION OF THE PREFERRED EMBODIMENTS

Figure 1A:
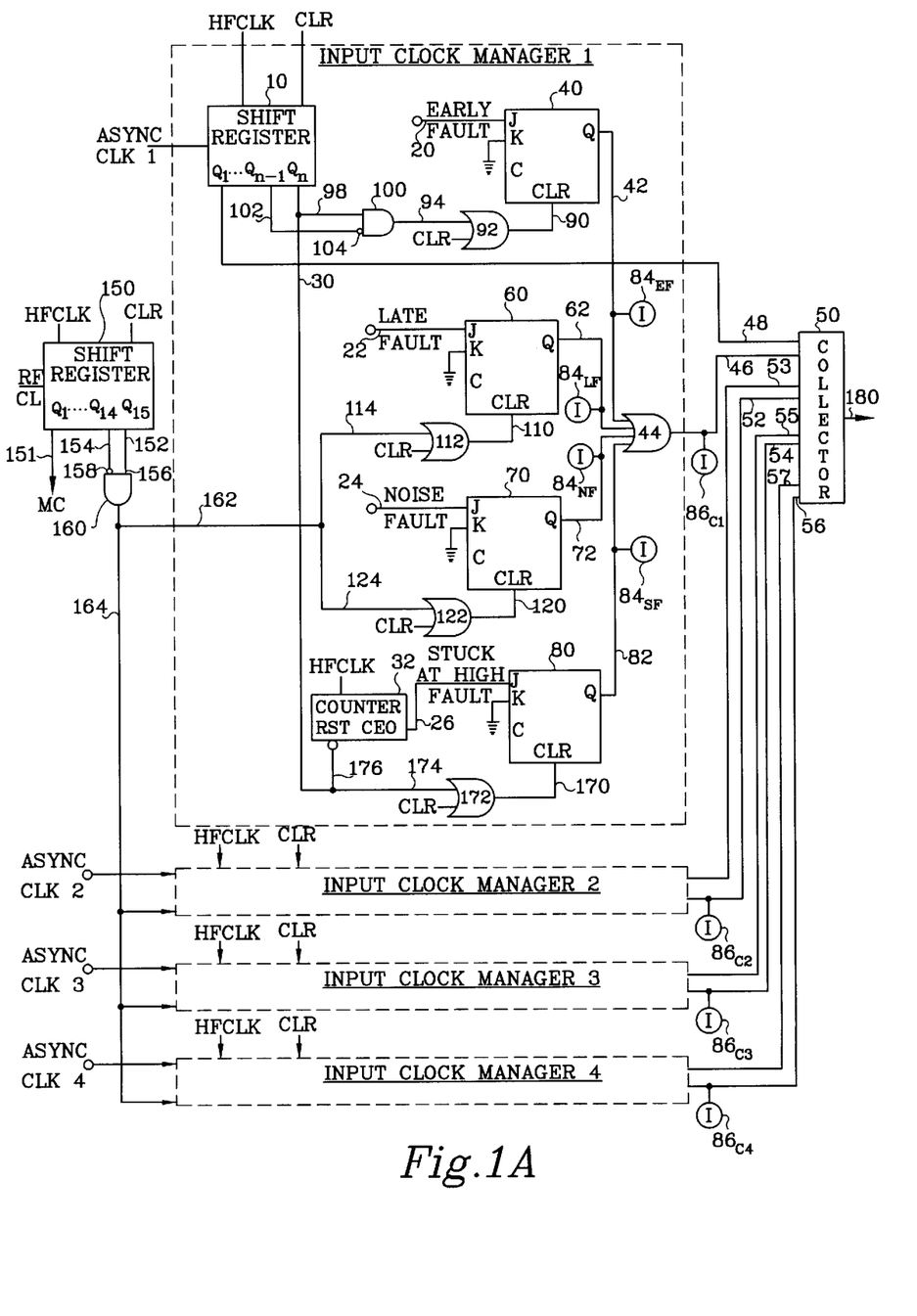
FIG. 1A shows an input clock manager circuit modified in accordance with the present invention.

In FIG. 1A, four input clock managers 1, 2, 3 and 4 are shown. While four input clock managers have been shown as an example, like the '363 patent, other numbers of clocks may be used depending on the number of clocks to be voted. The four input clock managers have substantially identical circuitry and accordingly, only input clock manager 1 is shown in detail. Input clock manager 1 is a modification of the input clock manager shown in FIG. 9 of the '363 patent and is shown receiving a first asynchronous clock input, ASYNC CLK 1, a high frequency clock input, HFCLK, and a reset input, CLR. Input clock managers 2, 3 and 4 also have shift registers therein (not shown) which receive the same inputs although each receives its own asynchronous clock input ASYNC CLK 2, 3 and 4 respectively.

The ASYNC CLK 1, HFCLK and CLR inputs are shown connected to a shift register 10 which produces a plurality of parallel delayed output clock signals at terminals identified as $Q_1, ---, Q_{n-1}$ and $Q_n$. Shift register 10 may be the same as the shift register 68 of the above referred to '363 patent and each successive output may shift the asynchronous clock 1 input by a slightly greater amount. Outputs shown as $Q_{n-1}$ and $Q_n$ may be like those shown as square waves 12 and 14 in FIG. 1B where it is seen that wave 14 is lightly more delayed than wave 12.

Figure 2A:
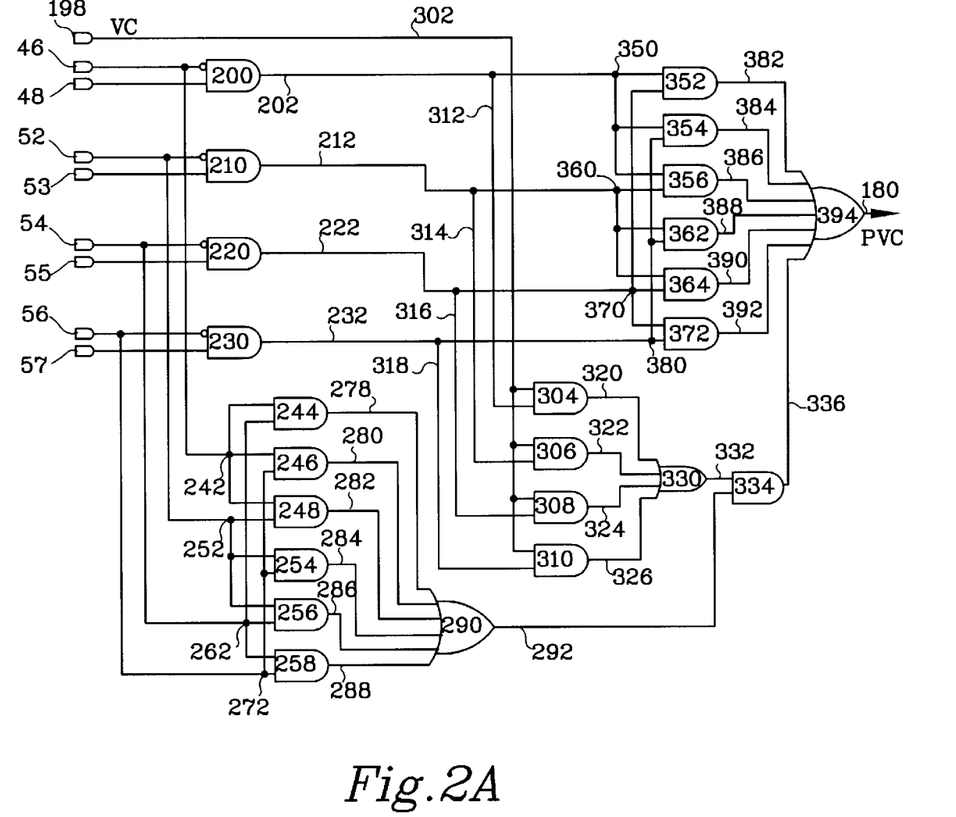
FIG. 2A shows a collector circuit modified in accordance with the present invention.

As will be further explained, a major difference from the '363 patent is shown in the input clock manager 1 schematic. The use of separate latches (flip flops) to latch each type of fault allows the use of individual reset signals for each of the different fault latches, and, in addition allows for further simplification of the '363 patent circuitry. For example, the '363 patent includes internal circuitry to synchronize the clock sources at start up. The revised voter of the present invention is used on signals which may be unsynchronized at start up. For example, each receiver may take different amounts of time to power up and so, even if they are started simultaneously, they would not normally provide their output signals even close to the same time. Accordingly, if the DGPS receiver signals were applied to the '363 patent circuitry, the system would fault out immediately after power up and could not thereafter be used. In the present invention, there is no need for the internal synchronization modules shown in FIG. 1 of the '363 patent. It should be noted, however, that with the use of DGPS time marks, substantial synchronization is later provided by the GPS time base. Furthermore, the revised voter of the present invention may be applied to the fault tolerant clock of the '363 patent per se, provided that fault recovery effects (to be explained herein) are properly addressed. Also, in the present invention, all of the clock inputs may be directly connected to the individual shift registers such as shift register 10 in FIG. 1. Other modifications to the '363 circuitry will be explained below and in connection with FIG. 2 of the present invention.

The early fault, late fault and noise fault signals which appear on lines 78, 84 and 92 in FIG. 9 of the '363 patent respectively are found in FIG. 1A of the present description on lines 20, 22 and 24 respectively. A fourth fault signal identified as a "stuck at high" fault (not found in the '363 patent) has been determined to be desirable and appears in FIG. 1 on a line 26. The "stuck at high" fault occurs when the asynchronous clock signal under examination remains at its high level for a longer period of time than it should indicating a fault has occurred. In FIG. 1A, the "stuck at high" signal is detected by feeding a delayed signal, for example, $Q_n$, over a line 30 to a counter 32 which also receives the HFCLK signal and which is started by the leading edge of the signal on line 30 to count to a predetermined number chosen to take enough time to assure that the trailing edge of the ASYNC CLK 1 signal should be well passed. The count may be up or down and, in a preferred embodiment, the counter is set to start at a number such as 6 and count up to a number such as 15 so that the time lapse can be made longer or shorter by changing the starting number. In any event at the end of the count, if the $Q_n$ signal is still high, a fault signal is presented from a carry enable output, CEO to the line 26 indicating the input is "stuck at high". The "stuck at high" fault is then stored in a latch to be described below.

The early fault signal on line 20 is presented to a latch 40 which may be like the D flip flop with the AND gate and the OR gate of the '363 patent but, in the present invention, is a JK flip flop. The signal on line 20 is presented to the J input while the K input is connected to ground. The Q output of flip flop 40 appears on a line 42 which is presented to one terminal of an OR gate 44 which has an output on a line 46. A clock signal from, for example, the $Q_1$ output of shift register 10, is applied to a line 48. The two signals on lines 46 and 48 are shown connected to a collector 50. Thus when an early fault has occurred, the output on line 42 causes a fault output from OR gate 44 on a line 46 so that the collector 50 will not allow the clock signal on line 48, to be used, as will be explained in connection with FIG. 2A. Collector 50 is also connected to receive fault signals and clock signals from the other input clock managers 2, 3 and 4 on pairs of lines such as 52–53, 54–55 and 56–57 respectively.

In similar fashion, the late fault signal on line 22 is presented to the J input of a latch 60 (another JK flip flop) whose K input is connected to ground. The Q output of flip-flop 60 appears on a line 62 which is presented to a second terminal of OR gate 44. Thus when a late fault has occurred, the output on line 62 causes a fault output from OR gate 44 on line 46 so that the clock signal on line 48 will not be used by the collector 50.

Likewise, the noise fault signal on line 24 is presented to the J input of a latch 70 (another JK flip-flop) whose K input is connected to ground. The Q output of flip-flop 70 appears on a line 72 which is presented to a third terminal of OR gate 44. Thus when a late fault has occurred, the output on line 72 causes a fault output from OR gate 44 on line 46 so that the clock signal on line 48 will not be used by the collector 50.

Finally, the "stuck at high" fault signal on line 26 is presented to the J input of a latch 80 (another JK flip-flop) whose K input is connected to ground. The Q output of flip-flop 80 appears on a line 82 which is presented to a fourth terminal of OR gate 44. Thus when a "stuck at high" fault has occurred, the output on line 82 causes a fault output from OR gate 44 on line 46 so that the clock signal on line 48 will not be used by the collector circuit 50.

As will be further explained, any one or more faults occurring in the clock signal of the circuit of FIG. 1A will prevent the collector circuit 50 from allowing the clock signal on line 48 to be used in the voting. Similar circuits (not shown) are employed for the other clock signals in input clock managers 2, 3 and 4 and, as mentioned, their fault outputs are presented on the input lines 52, 54 and 56 and their clock outputs are presented on input lines 53, 55 and 57 to collector 50 and the operation thereafter, will be described in connection with FIG. 2.

In some cases it may be desirable to be able to indicate the occurrence of a particular fault. In FIG. 1A, individual fault indicators $84_{EF}$, $84_{LF}$, $84_{NF}$ and $84_{SF}$ are shown connected to output lines 42, 62, 72 and 82 from the Q outputs of latches 40, 60, 70 and 80 respectively and may be employed to provide this function. While the individual fault indicators have been shown within the Input Clock Manager 1, they may be located at any convenient position internal or external to the Clock Manager 1. Clock Managers 2, 3 and 4 may also have similar fault indicators (not shown). In some cases it may be desirable to provide an indication when a fault has occurred in one or more of the clock outputs of the individual Clock Managers. In FIG. 1A, individual clock fault indicators $86_{C1}$, $86_{C2}$, $86_{C3}$ and $86_{C4}$ are shown connected to output lines 46, 52, 54 and 56 of Clock Managers 1, 2, 3 and 4 respectively and may be employed to provide this function. These clock fault indicators may also be placed at any convenient location internal or external to the Clock Managers.

The early fault signals and the "stuck at high" fault signals are detected by circuitry within the individual input clock managers while the late fault signals and the noise fault signals are generated with respect to timing signals external to the individual input clock managers. As will be discussed below, the reset signals for the early fault and "stuck at high" latches are also generated within the individual clock managers while the reset signals for the late fault and noise fault latches are generated externally to the individual input clock managers.

Figure 1B:
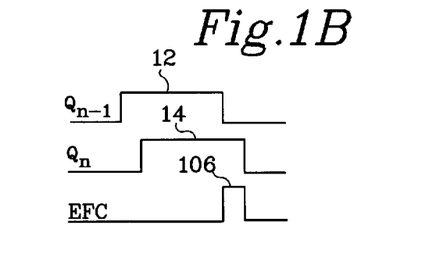
FIG. 1B shows a wave diagram relating to a portion of the circuitry of FIG. 1A.

The latch shown as JK flip-flop 40 receiving the early fault signal is reset by a signal presented to the CLR terminal on a line 90 connected to the output of an OR gate 92. OR gate 92 receives a first input CLR whenever the system enable signal is received i.e. whenever the system starts up. A second input to OR gate 92 on a line 94 occurs whenever the asynchronous input returns to logic zero, i.e. whenever the shift register 10 output has clocked in a low asynchronous clock signal. This condition is detected by, for example, checking the $Q_n$ signal against the $Q_{n-1}$ signal which is delayed a little less (e.g. one less period of the HFCLK) than the $Q_{n-1}$ signal as shown in FIG. 1B. If the $Q_{n-1}$ signal is low (e.g. a logic ZERO) when the $Q_n$ signal is high (e.g. a logic ONE), the delayed asynchronous clock input has returned to zero and the early fault latch may be cleared. This is determined in FIG. 1A by connecting the $Q_n$ output on line 30 through a line 98 to a first input terminal of an AND gate 100 and the $Q_{n-1}$ input on a line 102 to an inverted input terminal 104 of AND gate 100. With this arrangement, there will be a short high signal (as can be seen by the pulse 106 below square waves 12 and 14 in FIG. 1B) which is transmitted to OR gate 92 via line 94. Thus, whenever the asynchronous clock input transitions from logic one to logic zero, or whenever the system is initially started by a CLR signal, an output on line 90 from OR gate 92 resets flip-flop 40 and the clock signal on line 48 can again be used to contribute to the voting as long as no other fault signal exists. Since the shift register bit $Q_1$ on line 48 is the signal sent to the collector 50 for voting, and since the $Q_n$ and $Q_{n-1}$ signals on lines 98 and 102 are used for re-setting the early fault latch 40, the input clock signal on line 48 has already returned to zero before the early fault latch 40 is reset.

The latch shown as flip-flop 60 receiving the late fault signal is reset by a signal presented to the CLR terminal on a line 110 which is connected to the output of an OR gate 112. OR gate 112 receives a first input, CLR, whenever the system enable signal is received and a second input from a modification of the reference clock manager shown in FIG. 11 of the '363 patent. This modification is shown on the left side of FIG. 1A herein, and comprises the addition of several more states of delay to the shift register 102 of the '363 patent. This shift register is identified in FIG. 1A here in by reference numeral 150 having a reference clock input, RFCL, a high frequency clock input, HFCLK, and a clear input, CLR. The outputs will be the $Q_1$ through $Q_6$ outputs shown in FIG. 11 of the '363 patent, but with several more states of delay ($Q_7$–$Q_{15}$) added. It should be noted that the $Q_1$ output shown by arrow 151 is a synchronous reference clock signal used in both the '363 patent and in the present invention to provide the output for the downstream microcomputer (MC), but which is also used in the present invention to provide the verified clock (VC) signal used in FIG. 2A herein. This signal starts at a low value (e.g. a logic ZERO) and upon the occurrence of at least two non-faulted clock signals becomes a clock signal that rises from a logical ZERO to a high value (e.g. a logical ONE) at the leading edge of the second valid clock signal and falls to a logical ZERO again at the falling edge of the second to last clock signal. This will be described further in connection with FIG. 2A.

Two of the additional stages of delay are shown as outputs $Q_{14}$ and $Q_{15}$ which are chosen to provide a delay sufficient to allow the input clock manager shift registers, such as shift register 10, to clock through their current asynchronous clock states. Outputs $Q_{14}$ and $Q_{15}$ are connected by lines 152 and 154 to a first input, 156 and an inverting input, 158, respectively of an AND gate 160 the output of which is connected by a line 162 to line 114, the upper input to OR gate 112. As the logic one to logic zero transition of the RFCL clock is shifted through the added stages of delay, a clear signal is generated by the logical combination of $Q_{14}$ and inverse of $Q_{15}$. This creates a clear pulse after the late check has been performed, and the RFCL clock has returned to zero. This late reset signal is also sent to the other input clock managers, 2, 3 and 4, over a line 164.

The latch shown as flip-flop 70 receiving the noise fault signal is reset like flip-flop 60. More particularly, the noise fault latch 70 is reset by a signal presented to the CLR terminal on a line 120 connected to the output of an OR gate 122. OR gate 122 receives a first input CLR whenever the system enable signal is received and a second input from the above described modification to the reference clock manager over lines 162 and 124.

Since the late fault signal is generated by an examination of the leading edge of the asynchronous clock signal and since the noise fault signal is generated by an examination of the leading and falling edges of the asynchronous clock signal, flip-flops 60 and 70 may be reset at any time after the trailing edge of the synchronous reference clock signal because, if the late or noise fault condition continues to exist, another late or noise fault signal will set flip-flops 60 and 70 before the clock signals can be used in the collector 50.

As will further be explained, the trailing edge of a verified clock signal (to be discussed in connection with FIG. 2A) is used to generate the noise and late fault clear signals. In a manner similar to that of the early fault clear signal, the last bits of the reference clock manager $Q_{14}$ and $Q_{15}$ are used to detect this trailing edge and generate the clear signal.

Finally, flip-flop 80, connected to receive the "stuck at high" signal, is reset by a signal presented to the CLR terminal on a line 170 connected to the output of an OR gate 172. OR gate 172 receives a first input CLR whenever the system enable signal is received and a second input periodically after the falling edge of the asynchronous clock signal line 30. Accordingly, an inverted input terminal of OR gate 172 is connected by a line 174 to the $Q_n$ line 30 which is delayed with respect to the asynchronous clock. It should also be noted that the counter 32 is reset to the chosen value each cycle by a signal on line 176 connected to line 30.

The "stuck at high" signal is generated by the individual reference clock managers. Because of the reset terms for early, late, and noise are now periodically cleared, a "stuck at high" fault would propagate through to the collector if left undetected. The clear condition for the "stuck at high" fault is for the asynchronous clock input to refer to logic zero. This one to zero transition is delayed by the shift register 10. Then the $Q_n$ state=0 is used to clear the fault latch 80 via lines 174 and 170 and reset the "stuck at high" detector, counter 32 via line 176.

It is seen that if any fault occurs, collector 50, will receive the fault signal and, as will be further explained, will prevent the clock signal on lines 48, 53, 55 and 57 from being used. If no fault occurs, the clock output from collector 50 will be a candidate reference clock signal which is passed by an output shown as an arrow 180, to further signal processing circuitry (i.e. the reference clock manager of FIG. 11 in the '363 patent which has circuitry to prevent the reference clock from becoming corrupted by noise before being presented to the downstream microprocessor via output $Q_1$ of shift register 150 in FIG. 1A of the present invention).

It is therefore seen that the fault detection arrangement of the present invention allows an initial start up with asynchronous input signals and that when a fault is corrected, the system may continue to operate with the collector 50 using the now corrected signal in producing its output without waiting until the next initial system start up.

As mentioned above, the collector 50 of the present invention has been modified from the circuit of FIG. 10 in the '363 patent which operated to incorporate an internal clock signal $F_L$ whenever any one of the fault signals $F_I$, $F_J$ or $F_K$ occurred. The collector of the present invention, which will be described in connection with FIG. 2, produces an output signal representative of a plurality of the clock signals on lines 48, 53, 55 and 57, or, if there is one fault, the output will be representative of the remaining three non-faulted clock signals, or if there are two faults, the output will be representative of the remaining two non-faulted clock signals and the verified clock signal on output line 151 of FIG. 1A as will be explained. If there are three or more faults, the output clock signal on arrow 180 will disappear. Any invalid signals presented on lines 48, 53, 55 and 57 are excluded from the voting process. Thus, the collector of FIG. 2A takes the clock and fault status signals from each input clock manager and produces a pre-verified clock signal (PVC) which signal is a logical combination of the valid inputs only.

As will also be explained, the output of the collector 50 will transition only on the second like edge transition of the valid inputs. As mentioned, in the event of two invalid inputs, a verified clock signal is used to augment the plurality voting of the two remaining good inputs. This augmentation assures that the output of the collector transitions from a logic ONE to a logic ZERO only after the second valid input transitions from logic ONE to logic ZERO.

As seen in FIG. 2A, the verified clock signal, VC, is presented on an input 198, while the clock signals appear on inputs 48, 53, 55 and 57 and the fault signals appear at inputs 46, 52, 54 and 56 (using the same numbering as was used in FIG. 1A).

Fault input 46 is connected to an inverted input of an AND gate 200 while clock input 48 is connected to the other input of AND gate 200. Thus if there is no fault signal input 46 (e.g. a logic ZERO), this signal, being inverted, allows the output of AND gate 200 on a line 202 to be a replica of the clock signal at input 48. If a fault is present on input 46 (e.g. a logic ONE), this signal, being inverted, blocks AND gate 200 and the output on line 202 will be a constant logic ZERO.

Similarly, fault input 52 is connected to an inverted input of an AND gate 210 while clock input 53 is connected to the other input of AND gate 210. Thus if there is no fault signal at input 52 (e.g. a logic ZERO), this signal, being inverted, allows the output of AND gate 210 on a line 212 to be a replica of the clock signal at input 53. If a fault is present on input 52 (e.g. a logic ONE), this signal, being inverted, blocks AND gate 210 and the output on line 212 will be a constant logic ZERO.

Likewise, fault input 54 is connected to an inverted input of an AND gate 220 while clock input 55 is connected to the other input of AND gate 220. Thus if there is no fault signal at input 54 (e.g. a logic ZERO), this signal, being inverted, allows the output of AND gate 220 on a line 222 to be a replica of the clock signal at input 55. If a fault is present on input 54 (e.g. a logic ONE), this signal, being inverted, blocks AND gate 220 and the output on line 222 will be constant logic ZERO.

Finally, fault input 56 is connected to an inverted input of an AND gate 230 while clock input 57 is connected to the other input of AND gate 230. Thus if there is no fault signal at input 56 (e.g. a logic ZERO), this signal, being inverted, allows the output of AND gate 230 on a line 232 to be a replica of the clock signal at input 57. If a fault is present on input 56 (e.g. a logic ONE), this signal, being inverted, blocks AND gate 230 and the output on line 202 will be constant logic ZERO.

Fault input 46 is also connected to a junction 242 which is connected to the upper terminals of AND gates 244, 246 and 248. Similarly, fault input 52 is also connected to a junction 252 which is connected to the lower terminal of AND gate 248 and to the upper terminals of AND gates 254 and 256. Likewise, fault input 54 is also connected to a junction 262 which is connected to the lower terminals of AND gates 244 and 256 and to the upper terminal of an AND gate 258. Finally, fault terminal 56 is also connected to a junction 272 which is connected to the lower terminals of AND gates 246, 254 and 258. It will be remembered that the signals on terminals 46, 52, 54 and 56 are low, (i.e. logic ZEROS) for a no fault situation and high (i.e. logic ONES) when they are faulted. Accordingly, when there is no faults, all of the inputs to AND gates 244–256 are logic ZEROS and thus all of the outputs on lines 278–288 are also logic ZEROS. If there is one fault, three of the inputs to AND gates 244–256 are logic ONES and the rest are logic ZEROS. However, since it takes two logic ONES to produce a logic ONE at the output of an AND gate, the outputs on lines 278–288 remain logic ZEROS. When there are two or more faults, there will be at least one of the AND gates 244–258 which receives two logic ONE inputs and accordingly, will produce a logic ONE. In other words, AND gates 244–258 are connected so as to detect two or more simultaneous faults to produce a logic ONE.

Output lines 278–288 are connected to the input of an OR gate 290 which has an output on a line 292 so as to produce a logic ONE whenever one or more of the AND gates 244–258 produces a logic ONE. If one or less faults has occurred, the signal on output 292 is a logic ZERO.

The verified clock input terminal 198, which carries a verified clock signal, VC, and which is the same as the "synchronous reference clock signal 104" in FIG. 11 of the '363 patent, is connected by a line 302 to the upper terminals of four AND gates 304, 306, 308 and 310. The lower terminals of AND gates 304, 306, 308 and 310 are connected by lines 312, 314, 316 and 318 to lines 202, 212, 222 and 232 at the outputs of AND gates 200, 210, 220 and 230 respectively. It will be recalled, that when there is no fault signals at input terminals 46, 52, 54 or 56, the output signals on lines 202, 212, 222, and 232 follow the clock signals at terminals 48, 53, 55 and 57, and thus appear at the lower terminals of AND gates 304, 306, 308 and 310 respectively. Accordingly, with VC appearing at the upper terminals of AND gates 304, 306, 308 and 310, the outputs thereof on lines 320, 322, 324 and 326 respectively will be the logical AND of VC and the qualified clock inputs of 202, 212, 222 and 232 respectively. If, there is a fault on one of the fault inputs, (for example assume a fault at input 46), then a low signal (e.g. a logic ZERO) will be present on line 202 and line 312 to the lower input of AND gate 304 so that AND gate 304 will be blocked and the output on line 320 will be a constant logic ZERO. Similar operation of AND gates 306, 308 and 310 will produce an AND of VC and the qualified clock inputs on lines 322, 324, and 326 only when there is no fault on terminals 52, 54 and 56 respectively.

Lines 320, 322, 324 and 326 are connected to four inputs of an OR gate 330. Accordingly, an output on a line 332 from OR gate 330 will carry VC ANDed with those qualified clock inputs on lines 320, 322, 324 and 326. The signals on lines 202, 212, 222 and 232 will be logic ZERO's when there is a corresponding fault at one or more of the inputs 46, 52, 54 and/or 56.

The output signal on line 332 is presented to the upper input terminal of an AND gate 334 which has its lower input terminal connected to the output of AND gate 290 by line 292. It will be remembered that the signal on line 292 is high (e.g. a logic ONE) whenever there are two or more faults at the input terminals 46, 52, 54 and 56. Thus, under these conditions the signal on line 336 is replica of the signal on line 332. If there is one fault or less at terminals 46, 52, 54 and 565, the output of OR gate 290 is low (e.g. a logic ZERO) which blocks AND gate 334 so that its output on line 336 will be a logic ZERO.

The clock signal on line 202 (or a logic ZERO when there is a fault at input terminal 46), is also presented to a junction 350 which is connected to the upper terminals of three AND gates 352, 354 and 356. Similarly, the signal on line 212 is presented to a junction 360 which is connected to the upper terminals of AND gates 362 and 364 and also to the lower input terminal of AND gate 356. Likewise, the signal on line 222 is presented to a junction 370 which is connected to the upper terminal of an AND gate 372 and also to the lower terminals of AND gates 352 and 364. Finally, the signal on line 232 is presented to a junction 380 which is connected to the lower terminals of AND gates 354, 362 and 372. The outputs of AND gates 352, 354, 356, 362, 364 and 372 appear on lines 382, 384, 386, 388, 390 and 392 respectively and these are presented, along with the signal on line 336 to the input terminals of an OR gate 394 having an output shown by arrow 180 (which corresponds to arrow 180 of FIG. A and) is presented to downstream circuitry (not shown in FIG. 2A).

It will be remembered that the signals on lines 202, 212, 222 and 232 are replicas of the clock signals on terminals 48, 53, 55 and 57 when there are no faults or a logic ZERO's when there is a corresponding fault. If there is no fault, the inputs of all of the AND gates 352–372 will be qualified clock signals and the outputs on all lines 382–392 will be clocks signals each indicative of the combination of two qualified clock signals. If there is one fault at terminals 46, 52, 54 and 56, the input to three of the AND gates 352–372 will be a logic ZERO and accordingly three of the outputs on lines 382–392 will also be a logic ZEROS. If there are two faults at terminals 46, 52, 54 and 56, five of the AND gates 352–372 will receive a logic ZERO and only one will receive two valid clock signals and so only one of the outputs on lines 382–392 will be a clock signal indicative of the combination of those to valid clock signals. If there are three or four faults at terminals 46, 52, 54 and 56, all of the AND gates 352–372 will receive a logic ZERO so that none of the outputs on lines 382–392 will be clock signals, they will all be a logic ZERO.

It will be remembered that the signal on line 336 is a combination of the verified clock signal, VC, and the valid inputs when there are two or more simultaneous faults, otherwise the signal on line 336 is a logic ZERO. Thus, when there are no faults at terminals 46, 52, 54 and 56 there will be clock signals on all of the lines 382–392 indicative of the combination of all four of the valid signals and a logic ZERO on line 336. Under these circumstances, the output on arrow 180 will be a combination of the four valid inputs at terminals 48, 53, 55 and 57. When there is one fault at terminals 46, 52, 54 and 56 there will be a clock signal on three of the lines 382–392 indicative of the combination of the three valid clock signals and a logic ZERO on line 336. Under these circumstances, the output on arrow 180 will be a combination of the three valid inputs at terminals 46, 52, 54 and 56. When there are two faults at terminals 46, 52, 54 and 56, one of the lines 382–392 will have a clock signal indicative of the two remaining two valid clock signals at input terminals 46, 52, 54 and 56 and a clock signal on line 336 indicative of the combination of the two remaining valid clock signals with the VC clock signal. Under these circumstances, the output on arrow 180 will be representative of the two valid clock signals at terminals 46, 52, 54 and 56 and the clock signal on line 336 which is a combination of the VC clock signal and the two valid clock signals. When there are three or four faults, all of the signals on lines 382–392 will be logical ZERO and there will be a logical ZERO on line 336 because the VC signal is at a low value (e.g. logical ZERO) whenever there are less than two valid clock signals at terminals 48, 53, 55 and 57. Thus the output on arrow 180 will be a logical ZERO. The net result is that the output on arrow 180 is a combination of all of the good signals (when there are less than two faults) and, the combination of the two remaining good signals and the VC signal (when there are two faults). The signal on arrow 180 is identified as the pre-verified clock signal, PVC, as the term is used in the '363 patent.

Figure 3A:
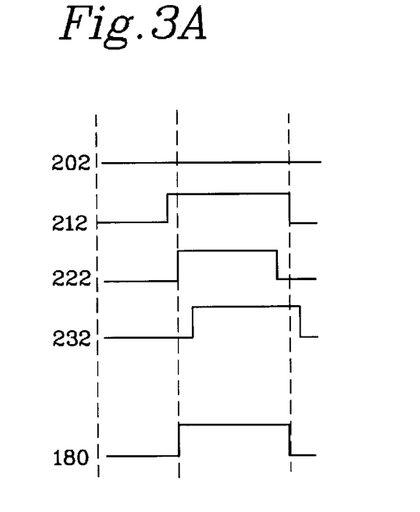
FIG. 3A shows a first wave diagram for signals which may occur in FIG. 2A.

When the output signal on arrow 180 is a clock signal, the rising from low to high and back to low is controlled by the high's and low's of the other clock signals. For example, FIG. 3A shows the signals that might exist on output lines 202, 212, 222 and 232 in FIG. 2A when there is one fault (assumed to be on output line 202 which is shown as a constant logical ZERO). The valid clock signals on output lines 212, 222 and 232 are not exactly in synchronism nor necessarily of exactly the same width. The signal on line 212 starts first and then the signal on line 222 which is shorter and finally the signal on line 232. With this situation, the output on arrow 180 will start at the leading edge of the second signal (i.e. that on line 222) and will end at the falling edge of the second to last signal to fall (i.e. that on line 212).

Figure 3B:
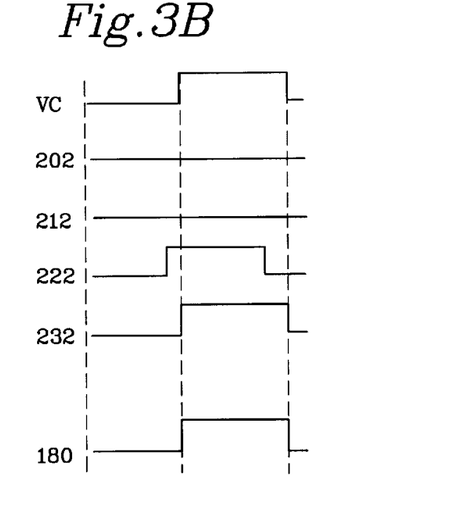
FIG. 3B shows a second wave diagram for signals which may occur in FIG. 2A.

FIG. 3B shows the signals that might exist on output lines 202, 212, 222 and 232 of FIG. 2A when there are two faults (assumed to be on output lines 202 and 212 which are shown as constant logic ZERO's). The VC signal will now be employed as shown in FIG. 3B and the output on arrow 180 will rise to a logic ONE with leading edge of the second input (i.e. the signal on line 232, the second to rise) and will fall to a logic ZERO at the falling edge of the second input (i.e. again, the signal on line 232, the second to fall). While the output on arrow 180 is shown to be the same as the VC signal, in actuality, they will differ by one cycle of the high frequency clock HFCLK and the signal on arrow 180 may contain noise which will not be true of the VC signal.

Figures 2B, 2C:
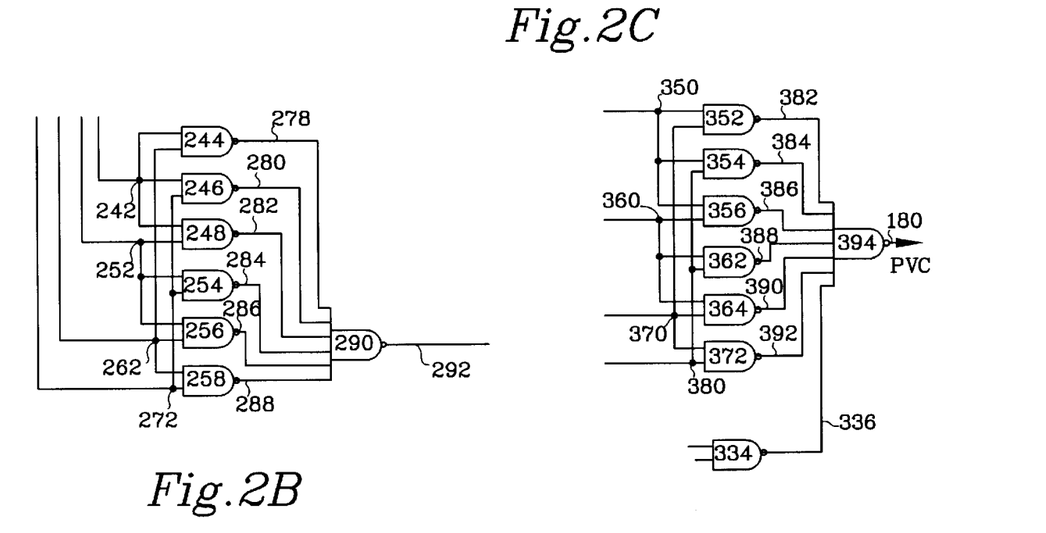
FIG. 2B shows an alternate embodiment for a portion of the circuit of FIG. 2A.
FIG. 2C shows another alternate embodiment of a portion of the circuit of FIG. 2A.

It is therefore seen that I have provided an improved fault tolerant clock voter which can work with asynchronous signals and which can again utilize a faulted signal after the fault is corrected without waiting for the system to be re activated. Further, I use a verified clock signal to provide an additional clock input whenever there are two faults. It should be noted that a number of obvious alterations may be made to the circuitry described herein without departing from the scope of the invention. For instance, various logic elements used herein may be replaced with other equivalents. For example, the OR gates 290 and 394 could be replaced by inverting AND gates with AND gates 244–258 and 352–372 being made inverting as is shown in FIG. 2B and FIG. 2C respectively wherein the identifying numbers remain the same as in FIG. 2A. Other changes will occur to those having ordinary skill in the art. Also, while the apparatus of the present invention has been shown for use in a DGPS system the invention herein described may be employed wherever faulty clock signals are to be distinguished from a plurality of clock signals and need to be analyzed for faults with faulty ones eliminated from consideration but reused when the faults are cleared. Accordingly since it is seen that the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for allowing a clock signal which has previously been faulted by one or more anomalies in the clock signal to again produce non-faulted signals upon correction of the anomalies, comprising:

a first latch normally operable to allow the clock signal to be used by further signal processing circuitry but upon the occurrence of a first anomaly to fault the clock signal and prevent its use by the further signal processing circuitry;

a second latch normally operable to pass the clock signal to the further signal processing circuitry but upon the occurrence of a second anomaly to fault the clock signal and prevent its use by the further signal processing circuitry; and a signal generator connected to the first and second latches to produce a reset signal to allow the clock signal to again be used by the further signal processing circuitry when the anomaly is corrected.

2. Apparatus according to claim 1 wherein the first and second anomalies comprise a late fault and a noise fault.

3. Apparatus according to claim 2 wherein the first and second latches comprise flip-flops with reset terminals.

4. Apparatus according to claim 3 wherein the signal generator is connected to the reset terminals.

5. Apparatus according to claim 2 wherein the signal generator includes delay apparatus connected to receive the clock signal and to produce first and second delayed clock signals.

6. Apparatus according to claim 5 wherein the delayed clock signals are compared to produce the reset signal which resets the first and second latches.

7. Apparatus according to claim 6 wherein the first and second latches comprise flip-flops with reset terminals.

8. In a system having an input clock signal and a latch, the latch normally operating so that the clock signal may be passed for utilization so long as the clock signal is valid, but, upon the occurrence of a fault, the system being operable to set the latch so as to prevent the clock signal from being utilized, the improvement comprising:

delay means operable to produce at least one delayed clock signal; and detecting means connected to the delay means to receive the delayed clock signal and operable to produce a reset signal; and, means connecting the detecting means to the latch to present the reset signal thereto so that the clock signal may again be utilized upon occurrence of the correction of the fault.

9. The system of claim 8 wherein the clock signal is a periodic wave having high portions and low portions, the fault occurs because a high portion starts earlier than it should and the detecting means receives first and second differently delayed clock signals each with delayed high and low portions and produces the reset signal when the second delayed clock signal has a delayed high portion which ends during a delayed low portion of the first delayed clock signal.

10. The system of claim 9 wherein the detecting means includes an AND gate having a first and an inverted input terminal and the first input terminal receives the first delayed clock signal while the inverted input receives the second delayed clock signal.

11. The system of claim 8 further including a second latch normally operating so that the clock signal may be passed for utilization so long as the clock signal is valid, but, upon the occurrence of a second fault, the system being operable to set the second latch so as to prevent the clock signal from being utilized;

second detecting means connected to the delay means to receive the delayed clock signal and operable to produce a second reset signal; and, means connecting the detecting means to the second latch to present the second reset signal thereto so that the clock signal may again be utilized upon occurrence of the correction of the second fault.

12. The system of claim 11 wherein the latch includes a fault terminal and the second detection means includes a counter which receives the delayed signal and produces a fault signal to the fault terminal when the delayed signal is still high after a predetermined count.

13. The system of claim 12 wherein the detection means produces the second reset signal each period of the delayed clock signal.

14. The system of claim 11 further including indicating means connected to the first and second latches to provide an indication of the occurrence of a fault in the input clock signal.

15. The system of claim 8 wherein the clock signal is a periodic wave having high portions and low portions, the latch includes a fault terminal and the fault occurs because a high portion lasts longer than it should, the detecting means includes a counter which receives the delayed signal and produces a fault signal to the fault terminal when the delayed signal is still high after a predetermined count.

16. The system of claim 15 wherein the detection means produces the reset signal each period of the delayed clock signal.

17. The system of claim 8 further including a fault indicator connected to the latch to provide an indication of occurrence of a fault.

18. In a fault tolerant clock circuit for transferring a plurality of clock inputs to downstream circuitry, said clock inputs each being susceptible to a plurality of faults the occurrence of any one of which operates to prevent the clock input with which the fault is associated from being transferred to the downstream circuitry, comprising:

a plurality of latches, each latch connected to receive a signal when one of the faults occurs and being set in accordance therewith to prevent the clock input with which it is associated from being transferred to the downstream circuitry, and each latch having a reset input operable upon receipt of a reset signal to reset the latch; and, a plurality of signal generators each operable to provide a reset signal to a respective one of the latches to so as to allow the transfer of the clock input with which it is associated upon the removal of the fault with which it is associated.

19. Apparatus according to claim 18 wherein the system includes a source of reference signal and a delay device operable to produce a plurality of outputs each representing a clock signal delayed by a predetermined amount, there are at least four clock inputs and the plurality of faults includes an early fault in which the leading edge of the clock signal occurs too soon with respect to a reference clock, a late fault in which the leading or trailing edges of a clock signal occur too late with respect to a reference signal, a noise fault in which the leading or trailing edges contain multiple transitions and a stuck at high fault in which the trailing edge of a clock signal does not occur within a predetermined time with respect to the reference signal; a first of the plurality of latches is set by the early fault signal and a first of the plurality of signal generators produces a pulse to reset the first latch whenever a first delayed clock signal is high at the same time a second delayed signal is low; a second and third of the latches are set by a late fault and a noise fault respectively and a second and third of the plurality of signal generators produces a signal to reset the second and third latches whenever a third delayed signal is high at the same time a fourth delayed signal is low; and, a fourth of the plurality of latches is set by a stuck at high fault and a fourth of the plurality of signal generators produces a signal to reset the fourth latch a predetermined time after a clock signal.

20. The apparatus according to claim 19 wherein the fourth of the plurality of signal generators includes a counter which is started by a clock signal and produces the signal to reset the fourth latch when the counter counts a predetermined number.

21. The apparatus according to claim 18 further including a plurality of indicators connected to the plurality of latches to provide an indication of faults in the clock inputs.

22. In a fault tolerant clock having at least four input clock signals and fault means operable to produce a fault signal for each of the clock signals upon the occurrence of a fault, the improvement comprising:
   a source of independent clock signal; and
   signal processing means connected to receive the clock signals and the fault signals associated with each clock signal and operable to produce an output indicative of at least three clock signals at least two of which comprise input clock signals which are free of a fault signal associated therewith and, when there are only two input clock signals which are free of a fault signal associated therewith, the signal processing means utilizing them and including the clock signal from the source of independent clock signal to produce the output.

23. Apparatus according to claim 22 wherein the signal processing means includes:
   a first set of logic devices, each having first and second inputs and operable to produce a first output signal;
   means connecting the first and second inputs of a first logic device to receive a first clock signal and a first fault signal respectively, the first output signal from the first logic device being representative of the first clock signal when there is no first fault signal and being representative of a fault when there is a first fault signal;
   means connecting the first and second inputs of a second logic device to receive a second clock signal and a second fault signal respectively, the first output signal from the second logic device being representative of the second clock signal when there is no second fault signal and being representative of a fault when there is a second fault signal;
   means connecting the first and second inputs of a third logic device to receive a third clock signal and a third fault signal respectively, the first output signal from the third logic device being representative of the third clock signal when there is no third fault signal and being representative of a fault when there is a third fault signal;
   means connecting the first and second inputs of a fourth logic device to receive a fourth clock signal and a fourth fault signal respectively, the first output signal from the fourth logic device being representative of the fourth clock signal when there is no fourth fault signal and being representative of a fault when there is a fourth fault signal;
   a second set of logic devices, each having first and second inputs and operable to produce a second output signal;
   means connecting the first and second inputs of each of at least six logic devices of the second set to receive a different two of the first, second, third and fourth fault signals so that the second output signal of each of the six logic devices is of a first characterization when one or less fault signals is applied to the inputs thereof and is of a second characterization when two fault signals are applied to the inputs thereof;
   first additional logic means connected to receive the second output signals and operable to produce a third output signal having a first logic value when all of the second signals have the first characterization and having a second logic value when at least one of the second signals has the second characterization;
   a third set of logic devices each having first and second inputs and operable to produce a fourth output signal;
   means connecting the first input of at least four logic devices of the third set to receive the independent clock signal and connecting the second input of the at least four logic devices of the third set each to receive a different one of the first output signals set so that the fourth output is indicative of a fault when the second input thereto is a fault signal, and so that the fourth output signal is indicative of the combination of two clock signals when the second input thereto is a clock signal;
   second additional logic means having an input connected to receive the fourth output signals and operable to provide a fifth output signal indicative of a fault when all of the fourth output signals are indicative of a fault and indicative of a combination of clock signals when at least one of the fourth output signals is indicative of the combination of two clock signals;
   third additional logic means having a first input connected to receive the fifth output signal and a second input connected to receive the third output signal and operable to produce a sixth output signal indicative of the fifth output signal when the third output signal is of the second logic value and indicative of the third output signal when the third output signal is of the first logic value;
   a fourth set of logic devices, each having first and second inputs and each operable to produce a seventh output signal;
   means connecting the first and second inputs of at least six of the logic devices of the fourth set to receive a different two of the first output signals so that the seventh signal from each logic device of the fourth set has a first value when one or both of the inputs thereto is representative of a fault and otherwise has a second value indicative of the combination of the two clock signals represented at the two inputs thereto; and,
   fourth additional logic means receiving the seventh output signals and the fifth output signal and operable to produce a resultant output signal indicative of a fault when there is more than two faults among the inputs to the first set of logic devices and indicative of the combination of at least three clock signals one of which is the independent signal when there are two faults among the inputs to the first set of logic devices.

24. A fault tolerant clock voter with recovery comprising:
   I) a plurality of input clock managers each having
      A) an input for receiving an input clock signal;
      B) a first output for providing an output clock signal for use in voting, said output clock signal representing the input clock signal;
      C) a plurality of latches, each having
         1. an first input for receiving a different one of a plurality of input signals each of which is indicative of a different anomaly in the input clock signal, said latch being set upon the receipt of a signal;
         2. an output for providing a fault signal when the latch is set; and,
         3. a second input for receiving a reset signal to reset the latch and remove the fault signal at the input;

D) combining means connected to receive the signals at the output of the latches to provide a second output of the clock manager for use in providing a fault signal when any of the latches are set;

II) a collector connected to said clock managers to receive the signals on each of the first and second outputs thereof, said collector operable to produce a secondary clock signal representing each clock signal received from the first outputs of the clock manager only when there is no fault signal at the second output of such clock manager, said collector operable to provide a resultant output indicative of the combination of the secondary clock signals whenever there are two or more of the secondary clock signals and, III) means for determining when an anomaly is corrected to produce a reset signal to the second input of the latch receiving the input signal indicative of that anomaly so that when all anomalies for that clock manager have been corrected, the first output of that clock manager may be used by the collector to produce a secondary clock signal in accordance therewith.

25. Apparatus according to claim 24 further including an independent source of clock signal for use by the collector for inclusion with the secondary clock signals in producing the resultant signal when there are only two secondary clock signals.

26. The method of providing a voted clock signal representing a plurality of individual clock signals which may contain one of a plurality of anomalies, comprising the steps of:

A. producing a fault signal for each anomaly in each individual clock signal;

B. producing a substitute clock signal for each individual clock signal which does not have any anomalies;

C. producing a voted signal from the substitute clock signals when there are three or more substitute clock signals; and D. producing a voted signal from the substitute clock signals in combination with an independent clock signal when there are two substitute clock signals.

27. A collector for processing a plurality of clock signals each accompanied by a fault signal when the clock signal it accompanies has a fault;

first means connected to receive the clock signals and the fault signals and operable to produce a plurality of secondary clock signals each representing one of the clock signals when there is no fault signal accompanying such clock signal;

second means connected to receive the secondary clock signals and operable to produce a resultant output indicative of the combination of the secondary clock signals whenever there are two or more of the secondary clock signals;

an independent clock signal source;

third means connected to receive the first output signals and the independent clock signal and operable to provide an additional signal indicative of the combination of the secondary clock signals and the independent clock signal when there are two fault signals, said second means receiving the additional signal so that the resultant output is indicative of the secondary clock signals in combination with the additional clock signal when there are two fault signals.

28. Apparatus according to claim 27 wherein the additional signal operates to block the second means so that it does not produce the resultant signal when there are less than two secondary clock signals.

* * * * *

UNITED STATES PATENT AND TRADEMARK OFFICE
CERTIFICATE OF CORRECTION

PATENT NO. : 6,272,647 B1
DATED : August 7, 2001
INVENTOR(S) : Charles W. Rolston It is certified that error appears in the above-identified patent and that said Letters Patent is hereby corrected as shown below:

Column 16,
Line 21, change "first output" to -- secondary clock --

Signed and Sealed this

Twenty-sixth Day of March, 2002

Attest:

JAMES E. ROGAN
*Attesting Officer*     *Director of the United States Patent and Trademark Office*